US012158713B2

(12) United States Patent
Matayoshi et al.

(10) Patent No.: US 12,158,713 B2
(45) Date of Patent: Dec. 3, 2024

(54) HEATER AND IMAGE HEATING DEVICE

(71) Applicant: CANON KABUSHIKI KAISHA, Tokyo (JP)

(72) Inventors: Yasumasa Matayoshi, Shizuoka (JP); Keigo Akiya, Tokyo (JP); Teruhiko Namiki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/688,612

(22) Filed: Mar. 7, 2022

(65) Prior Publication Data

US 2022/0291611 A1 Sep. 15, 2022

(30) Foreign Application Priority Data

Mar. 12, 2021 (JP) ................................ 2021-040612

(51) Int. Cl.
*G03G 15/20* (2006.01)
*G03G 15/00* (2006.01)

(52) U.S. Cl.
CPC ..... *G03G 15/2039* (2013.01); *G03G 15/2053* (2013.01); *G03G 15/5045* (2013.01)

(58) Field of Classification Search
CPC ........... G03G 15/2053; G03G 15/2042; G03G 15/2039; G03G 2215/2035; G03G 15/80
See application file for complete search history.

(56) References Cited

U.S. PATENT DOCUMENTS

2019/0369534 A1* 12/2019 Nishikata ........... G03G 15/2053
2020/0081377 A1* 3/2020 Shimura ................ G03G 15/80

FOREIGN PATENT DOCUMENTS

JP 2019-207379 A 12/2019
JP 2021002032 A 1/2021

* cited by examiner

*Primary Examiner* — Jessica L Eley
(74) *Attorney, Agent, or Firm* — Canon U.S.A., Inc. IP Division

(57) ABSTRACT

A heater for an image heating device includes a substrate having first and second surfaces, a heat generating element electrically connected to a first electrode group, both formed on the first surface, a temperature detection element electrically connected to a second electrode group, both formed on the second surface. A plurality of first feed terminals provided in the image heating device in contact with the first electrode group. A plurality of second feed terminals provided in the image heating device in contact with the second electrode group. The first and second electrode groups are disposed on the same side of a midpoint of the substrate in a longitudinal direction. The second electrode group is disposed closer to the midpoint than the first electrode group in the longitudinal direction. The first and second electrode groups are disposed with a gap between the first and second electrode groups in the longitudinal direction.

8 Claims, 12 Drawing Sheets

HEATER AND IMAGE HEATING DEVICE

BACKGROUND

Field

The present disclosure relates to an image heating device, such as a fixing unit mounted in an electrophotographic image forming apparatus (for example, a copying machine or a printer) or a surface treatment device that re-heats a toner image fixed on a recording medium to change the gloss and surface property of the toner image. In particular, the present disclosure relates to an image heating device that heats a toner image via a cylindrical film. The present disclosure also relates to a heater mounted in the image heating device.

Description of the Related Art

Japanese Patent Laid-Open No. 2019-207379 describes a fixing device having a heater in the interior space of a cylindrical fixing film, and the heater includes a plurality of independently controllable heat generating elements. Furthermore, the heater described in Japanese Patent Laid-Open No. 2019-207379 has heat generating elements on one side of a heater substrate and a thermistor on the other side for temperature detection to ensure insulation between an electrode of the heat generating element and an electrode of the thermistor.

It is required to satisfy basic insulation or reinforced insulation between the electrode for the heat generating element and the thermistor electrode depending on the configuration. According to Japanese Patent Laid-Open No. 2019-207379, an electrode for feeding power to a plurality of heat generating elements and an electrode for feeding power to a plurality of thermistors need to be separated from each other with a distance corresponding to a required insulation distance therebetween in the longitudinal direction of a heater substrate.

However, to further ensure the insulation distance between the electrode for feeding power to the plurality of heat generating elements and a conductor connected to the electrode for feeding power to the plurality of thermistors, an insulation distance is required not only in the longitudinal direction of the heater substrate but also in the transverse direction of the heater. In addition, when the number of required thermistors is increased to detect the temperatures of the plurality of heat generating elements more accurately, the number of interconnection wires connected to the thermistors provided on the heater substrate also increases. In this case, it is necessary to extend the heater substrate in the transverse direction to ensure the insulation distance for the plurality of interconnection wires. With the extension of the heater substrate in the transverse direction, issues arise such as an increase in the size of the fixing device, a defective image due to an increase in the fixing nip width more than necessary, and an increase in the cost of the heater.

SUMMARY

Disclosed is a technique to avoid an increase in the size of the heater substrate in the transverse direction while ensuring insulation distances between the electrode for feeding power to a plurality of heat generating elements and each of the electrode for feeding power to the thermistor and the conductor.

According to an aspect of the present disclosure, a heater for use in an image heating device includes a substrate, at least one heat generating element formed on a first surface of the substrate, a first electrode group formed on the first surface and electrically connected to the at least one heat generating element, wherein a plurality of first feed terminals provided in the image heating device are in contact with the first electrode group, at least one temperature detection element formed on a second surface opposite to the first surface of the substrate, and a second electrode group formed on the second surface and electrically connected to the at least one temperature detection element, wherein a plurality of second feed terminals provided in the image heating device are in contact with the second electrode group, wherein the first electrode group and the second electrode group are disposed on the same side of a midpoint of the substrate in a longitudinal direction, and the second electrode group is disposed closer to the midpoint than the first electrode group in the longitudinal direction, and wherein the first electrode group and the second electrode group are disposed with a gap between the first electrode group and the second electrode group in the longitudinal direction.

Further features of the present disclosure will become apparent from the following description of exemplary embodiments with reference to the attached drawings.

DESCRIPTION OF THE EMBODIMENTS

First Embodiment

Embodiments of the present disclosure are described below with reference to the accompanying drawings. It should be noted that the embodiments described below are merely examples, and the technical scope of the present disclosure is not limited to the embodiments. In addition, all of the features and the combinations thereof described in the embodiments are not necessarily essential to the disclosure.

Image Forming Apparatus

Figure 1:
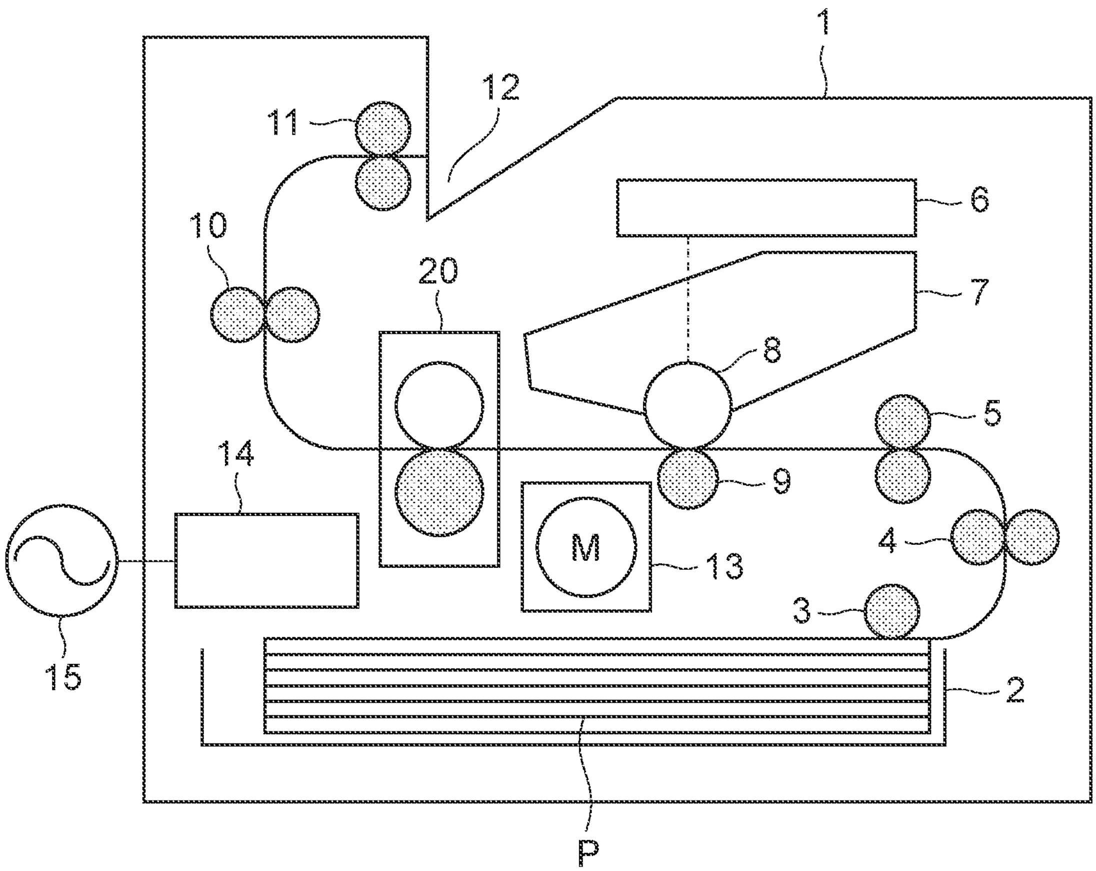
FIG. 1 is a cross-sectional view of an image forming apparatus.

FIG. 1 is a schematic configuration diagram of an image forming apparatus 1 according to the present embodiment. The image forming apparatus 1 is a laser printer using an electrophotographic recording technique. When the image forming apparatus 1 receives a print signal from an external apparatus, a scanner unit 6 emits a laser beam in accordance with received image information to expose a photosensitive member 8 included in an image forming process unit 7. As a result, an electrostatic latent image based on the laser beam is formed on the photosensitive member 8. Then, when toner is supplied, a toner image corresponding to the image information is formed on the photosensitive member 8. A sheet supplying cassette 2 has recording media P (for example, plain paper sheets) stacked therein. The recording media P stacked in the sheet supplying cassette 2 are fed one by one by a pickup roller 3 and is conveyed toward a registration roller 5 by a conveyance roller 4. The recording medium P is conveyed from the registration roller 5 to a transfer position at the time when the toner image on the photosensitive member 8 reaches the transfer position formed by the photosensitive member 8 and the transfer roller 9. When the recording medium P passes through the transfer position, the toner image on the photosensitive member 8 is transferred to the recording medium P. Thereafter, the recording medium P is heated by a fixing unit 20, so that the toner image transferred on the recording medium P is fixed onto the recording medium P. The recording medium P having the toner image fixed thereon is discharged onto an output tray 12 disposed on the upper side of the image forming apparatus 1 by a conveyance roller 10 and a discharge roller 11. A motor 13 drives, for example, the fixing device. Furthermore, a control circuit 14 connected to an AC power supply 15 supplies electric power to the fixing unit 20 and other loads. The photosensitive member 8, the scanner unit 6, the image forming process unit 7, and the transfer roller 9 described above form an image forming unit for forming an unfixed toner image on the recording medium P.

Fixing Unit

Figure 2:
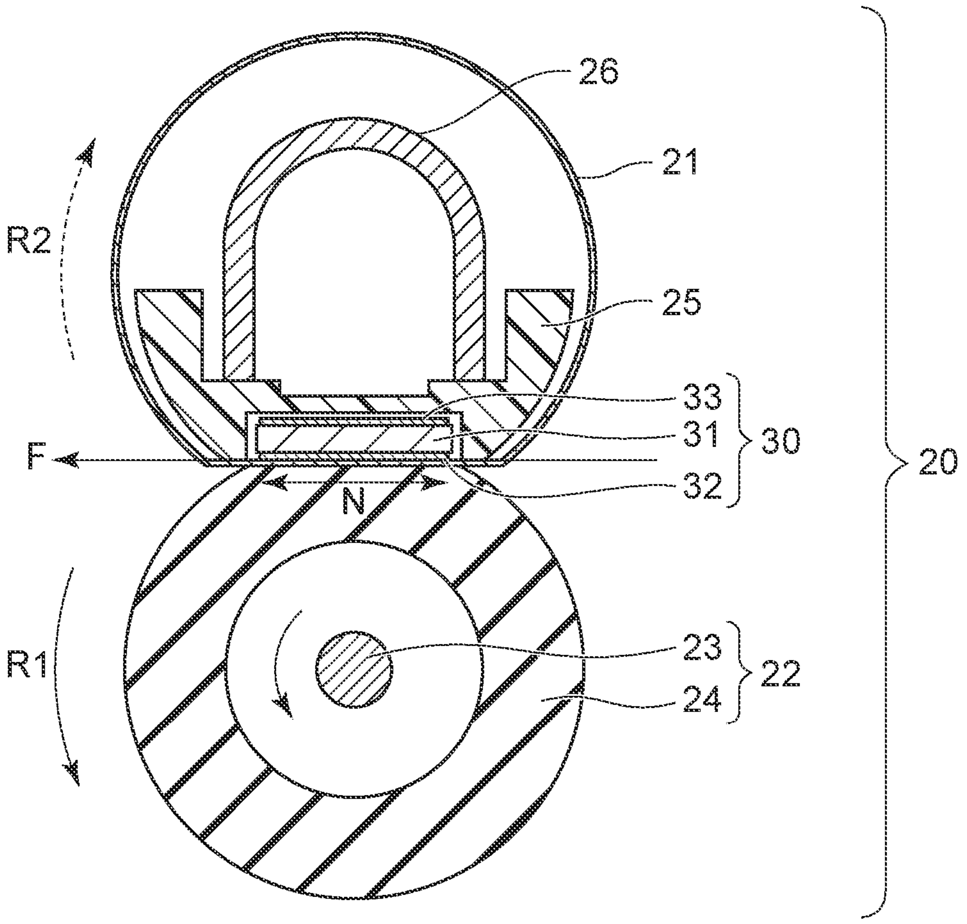
FIG. 2 is a cross-sectional view of a fixing unit.

FIG. 2 is a cross-sectional view of the fixing unit 20.

The fixing unit 20 includes a cylindrical film (a fixing film having a cylindrical shape) 21, a heater 30 provided in the interior space of the film 21, and a pressure roller (a nip portion forming member) 22 that forms a fixing nip portion N together with the heater 30 via the film 21. The film 21 is brought into contact with an unfixed toner image formed on the recording medium P. The pressure roller 22 has a core metal 23 made of a material, such as iron or aluminum, and an elastic layer 24 made of a material, such as heat-resistant rubber. The heater 30 is held by a heater holder 25 which is a holding member made of heat-resistant resin. The heater holder 25 also has a guide function of guiding the rotation of the film 21. A stay 26 is a metal stay for applying the pressure of a spring (not illustrated) to the heater holder 25.

The stay 26 receives the pressure of a spring (not illustrated) and urges the heater 30 toward the pressure roller 22 via the heater holder 25. The elastic layer 24 of the pressure roller 22 is elastically deformed upon receiving an urging force from the heater 30 and, thus, the fixing nip portion N is formed. The film 21 enters a mode in which it is nipped between the heater 30 and the pressure roller 22 in the fixing nip portion N. When the pressure roller 22 rotates in the direction of an arrow R1 via a gear train (not illustrated) driven by the motor 13, the film 21 nipped in the fixing nip portion N drivenly rotates in the direction of an arrow R2. An arrow F indicates the conveyance direction of the recording medium P. In addition, the recording medium P bearing the unfixed toner image enters the fixing nip portion N and, thus, is nipped and conveyed while being heated. In this manner, the toner image is fixed (the unfixed toner image is fixed to the recording medium by the heat of the heater).

Configuration of Heater

Figure 3A:
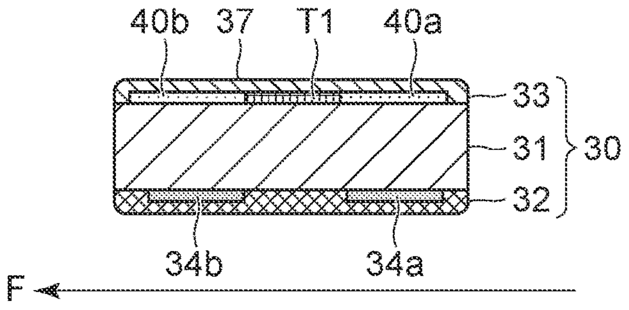
FIGS. 3A and 3B are a cross-sectional view and a configuration diagram of a heater and the layers according to a first embodiment.
Figure 3B:
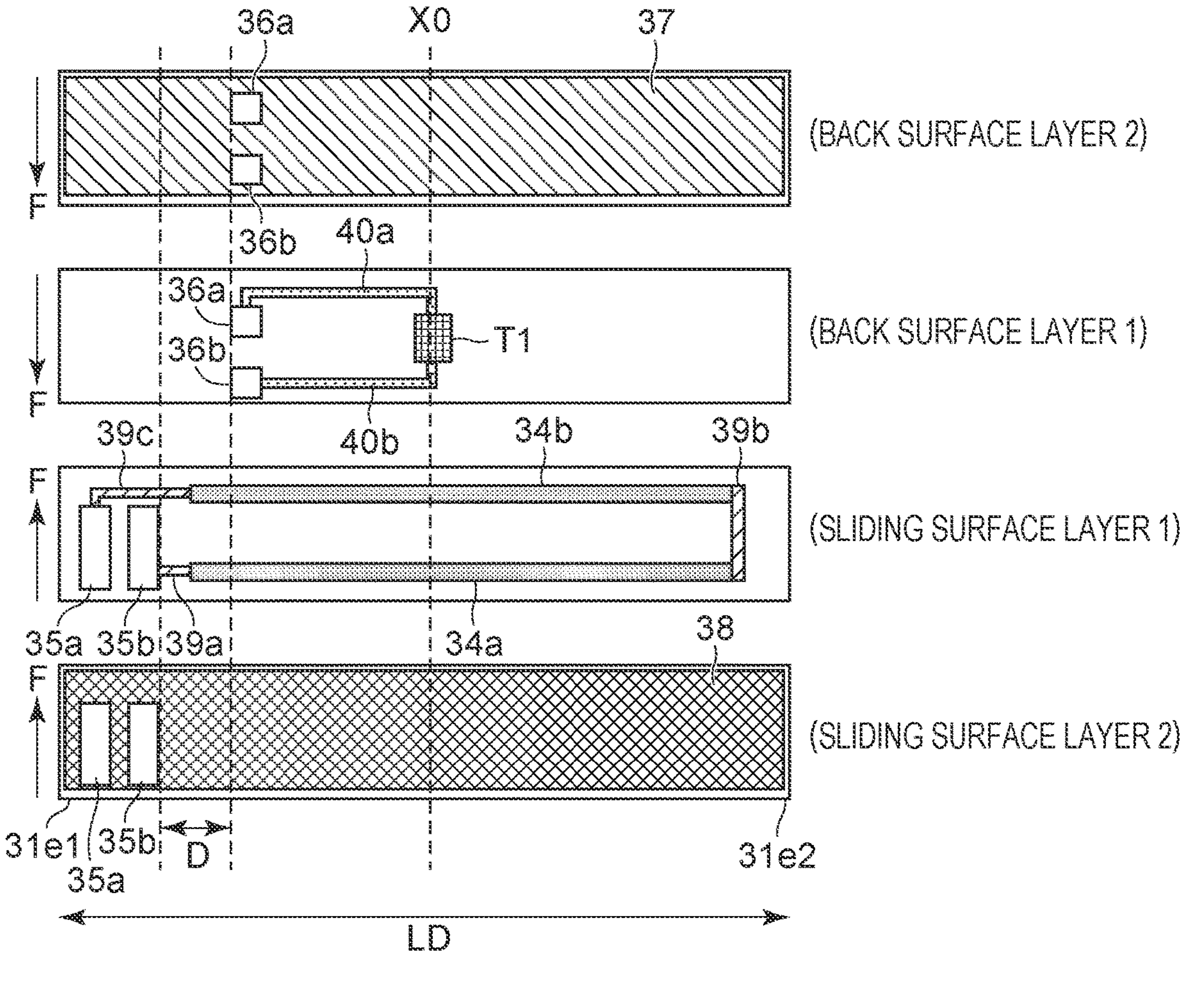

The configuration of the heater 30 according to the present embodiment is described below. FIG. 3A is a cross-sectional view of the heater 30 taken at the midpoint of the heater 30 in the longitudinal direction. FIG. 3A corresponds to an enlarged view of the heater 30 illustrated in FIG. 2. FIG. 3B is a plan view illustrating the configuration of the heater 30 in a longitudinal direction LD. A back surface layer 1 and a back surface layer 2 illustrated in FIG. 3B indicate views of a heater back surface layer 33, which is the surface of a substrate 31 remote from the pressure roller 22. The back surface layer 2 indicates a view of the heater back surface layer 33 with protective glass 37, and the back surface layer 1 indicates a view of the heater back surface layer 33 without the protective glass 37. Note that the heater back surface layer 33 is also referred to as a "first surface". The sliding surface layer 1 and the sliding surface layer 2 illustrated in FIG. 3B indicate views of a heater sliding surface layer 32, which is the surface of the substrate 31 adjacent to the pressure roller 22. The sliding surface layer 2 indicates a view of the heater sliding surface layer 32 with protective glass 38, and the sliding surface layer 1 indicates a view of the heater sliding surface layer 32 without the protective glass 38. Note that the heater sliding surface layer 32 is also referred to as a "second surface". In addition, an arrow F indicates the conveyance direction of the recording medium P. Furthermore, in FIG. 3B, a conveyance reference position of the recording medium P is denoted by X0, which coincides with the midpoint of the recording medium P in the width direction. Even when the recording media P having different sizes are fed, the recording media P are conveyed such that the midpoint of the recording medium P in the sheet width direction coincides with the conveyance reference position X0.

As indicated by the sliding surface layer 1, the sliding surface layer 32 of the substrate 31 includes heat generating elements 34*a* and 34*b* each extending in the longitudinal direction LD of the heater 30. The heat generating element 34*a* is disposed on the upstream side in the conveyance direction of the recording medium P, and the heat generating element 34*b* is disposed on the downstream side. Conductors 39*a* to 39*c* are connected to both ends of the two heat generating elements. One end of the conductor 39*a* is connected to a heat generating element electrode 35*b*, and the other end is connected to the heat generating element 34*a*. One end of the conductor 39*b* is connected to the heat generating element 34*a*, and the other end is connected to the heat generating element 34*b*. One end of the conductor 39*c* is connected to the heat generating element 34*b*, and the other end is connected to a heat generating element electrode 35*a*. Thus, the heater circuit configuration is such that the heat generating elements 34*a* and 34*b* generate heat at the same time by feeding power between the heat generating element electrodes 35*a* and 35*b*. Insulating protective glass 38 is disposed on the two heat generating elements 34*a* and 34*b* so as to cover the heat generating elements 34*a* and 34*b* and the conductors 39*a* to 39*c* except for the heat generating element electrodes 35*a* and 35*b* for insulation purpose. That is, as indicated by the sliding surface layer 2 illustrated in FIG. 3B, only the heat generating element electrodes 35*a* and 35*b* are exposed. In this way, by covering the heat generating elements 34*a* and 34*b* and the conductors 39*a* to 39*c* by using the insulating protective glass 38, insulation distances from the other members are ensured. The film 21 slides on the surface of the protective glass 38. Feed terminals 41*a* and 41*b* of an AC connector 41, which is an electrical contact member (described below), are brought into contact with the heat generating element electrodes 35*a* and 35*b* and, thus, a feed circuit is formed that feeds power from the AC power supply 15 to the heat generating elements 34*a* and 34*b*. Note that the feed terminals 41*a* and 41*b* are also referred to as "first feed terminals", the AC connector 41, which is an electrical contact member, is also referred to as a "first connector", and the heat generating element electrodes 35*a* and 35*b* are also collectively referred to as a "first electrode group".

As indicated by the back surface layer 1, a thermistor T1 (a temperature detection element) T1 is provided on the heater back surface layer 33 of the substrate 31. The thermistor T1 is disposed at a position that is substantially the same as the conveyance reference position X0. In addition, the thermistor T1 is connected to thermistor electrodes 36*a* and 36*b* via conductors 40*a* and 40*b*, respectively. Because the thermistor T1 has a negative resistance temperature characteristic and a characteristic that the resistance value changes in accordance with the temperature, the thermistor T1 has a function of detecting the temperature of the heater 30. Insulating protective glass 37 is disposed on the thermistor T1 so as to cover the thermistor T1 and the conductors 40*a* and 40*b* except for the thermistor electrodes 36*a* and 36*b* for insulation purpose. That is, as indicated by the back surface layer 2 illustrated in FIG. 3B, only the thermistor electrodes 36*a* and 36*b* are exposed. In this way, by covering the thermistor T1 and the conductors 40*a* and 40*b* by using the insulating protective glass 37, insulation distances from the other members are ensured. A DC connector 413, which is an electrical contact member (described below), is in contact with the electrodes 36*a* and 36*b* and is connected to the control circuit 14 via a DC bundle wire 414. The control circuit 14 detects the temperature sensed by the thermistor T1. The control circuit 14 controls the electric power supplied to each of the heat generating elements so that the sensed temperature of the thermistor T1 is the same as a target temperature suitable for the fixing operation. Note that the terminals of the DC connector 413 may be in direct contact with the electrodes 36*a* and 36*b*, or the terminals of the DC connector 413 may be directly joined to the electrodes 36*a* and 36*b* by using high melting point solder, welding, or the like. Alternatively, a surface mount type substrate connector may be mounted on the electrodes 36*a* and 36*b* by using high melting point solder and may be connected to a connector provided at one end of the DC bundle wire 414. Note that the thermistor T1 is also referred to as a "temperature detection element", the DC bundle wire 414 is also referred to as a "second feed terminal", the DC connector 413, which is an electrical contact member, is also referred to as a "second connector", and the thermistor electrodes 36*a* and 36*b* are also collectively referred to as a "second electrode group". Also note that the DC bundle wire 414 may have a single feed terminal or may have a plurality of feed terminals.

Control Circuit of Fixing Unit

Figure 5:
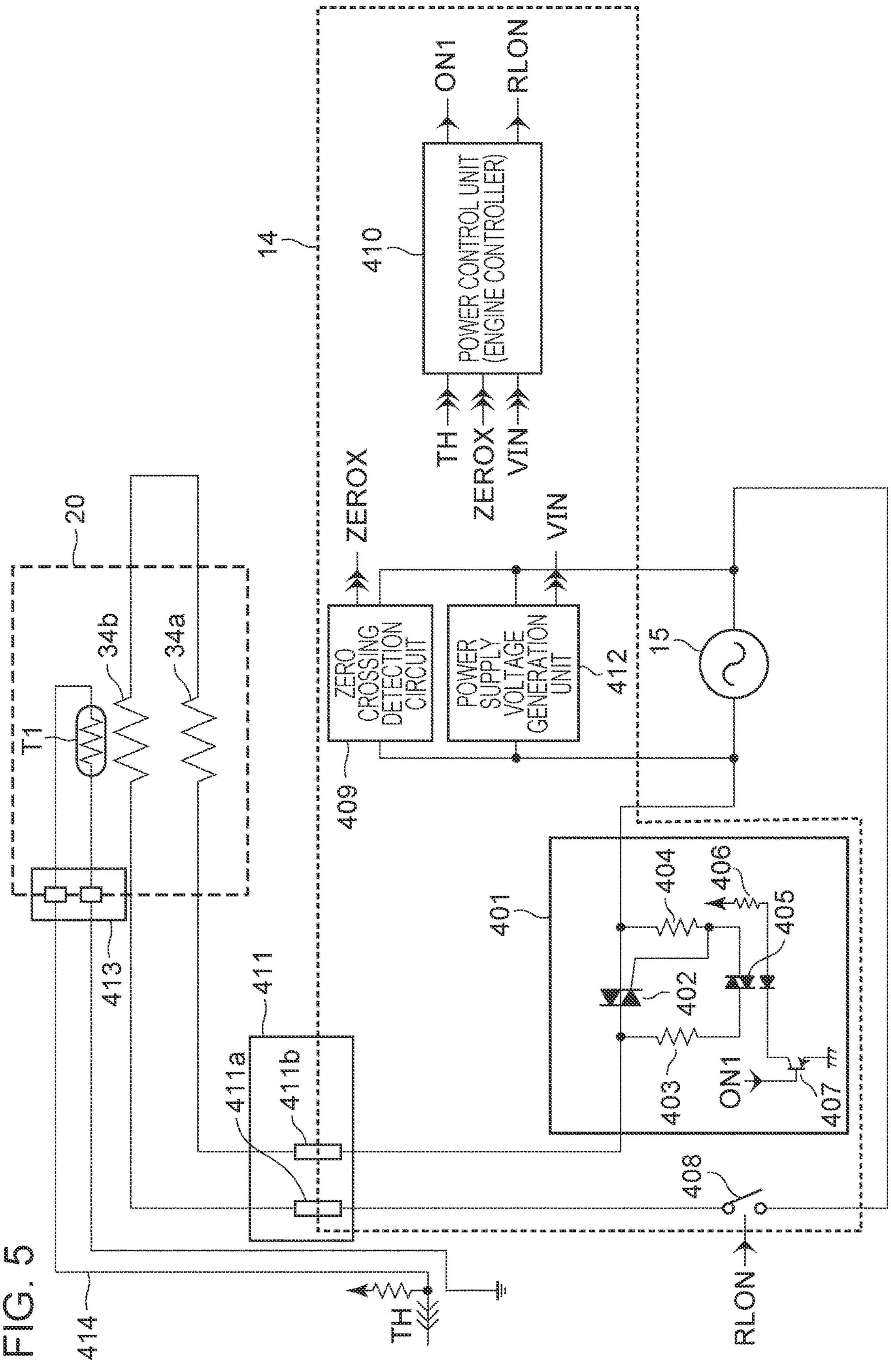
FIG. 5 is a drive circuit diagram including the fixing unit according to the first embodiment.

FIG. 5 illustrates a control circuit 14 that supplies electric power from the AC power supply 15 to the fixing unit 20 according to the present embodiment. The control circuit 14 includes a power supply unit 401, a zero crossing detection (ZEROX) circuit unit 409, a power supply voltage generation unit 412, a relay 408, and a power control unit 410 (hereinafter referred to as an engine controller 410). The power supply unit 401 is connected to one end of the AC power supply 15 and is connected to the fixing unit 20 via a connection terminal 411*b* in the AC connector 411. An ON1 signal output from the engine controller 410 causes an electric current to flow through a phototriac coupler 405 via a transistor 407. As a result, an electric current flows through the gate of a triac 402, and the triac 402 is turned on. Thus, an electric current flows through the triac 402. Both the zero crossing detection circuit unit 409 and the power supply voltage generation unit 412 are connected to the AC power supply 15. The zero crossing detection circuit unit 409 outputs a zero crossing signal indicating the zero crossing point of the commercial AC waveform to the engine controller 410. The power supply voltage generation unit 412 generates, from a commercial AC waveform, a power supply voltage necessary for the operation performed by the engine controller 410 and other parts. The engine controller 410 outputs an ON1 signal to control the power supply unit 401 so that the detected temperature is a predetermined temperature on the basis of the temperature information sent from the temperature detection element T1 inside the fixing unit 20 via the DC bundle wire 414.

Arrangement of Heat Generating Element Electrodes and Thermistor Electrodes

The arrangement of the heat generating element electrodes 35*a* and 35*b* and thermistor electrodes 36*a* and 36*b* is described below with reference to FIG. 6. According to the present embodiment, the heat generating element electrodes 35*a* and 35*b* and the thermistor electrodes 36*a* and 36*b* are provided in the same region on one side of the midpoint of the substrate 31 in the longitudinal direction. In addition, the thermistor electrodes 36*a* and 36*b* are disposed closer to the midpoint (the conveyance reference position X0) than the heat generating element electrodes 35*a* and 35*b*. Furthermore, of the heat generating element electrodes 35*a* and 35*b*, the heat generating element electrode 35*b* closer to the thermistor electrode and the thermistor electrodes 36*a* and 36*b* are disposed with a predetermined gap (a gap D) therebetween in the longitudinal direction of the heater 30. The gap D is provided to ensure the required insulation distance between the heat generating element electrodes 35*a* and 35*b* and the thermistor electrodes 36*a* and 36*b*. By employing such an arrangement, when the substrate 31 is viewed in the thickness direction of the heater, the insulation distance need not be taken into account between the conductors 40*a* and 40*b* in the back surface layer 1 and the heat generating element electrodes 35*a* and 35*b* in the sliding surface layer 1 in the transverse direction of the substrate 31.

Figure 4:
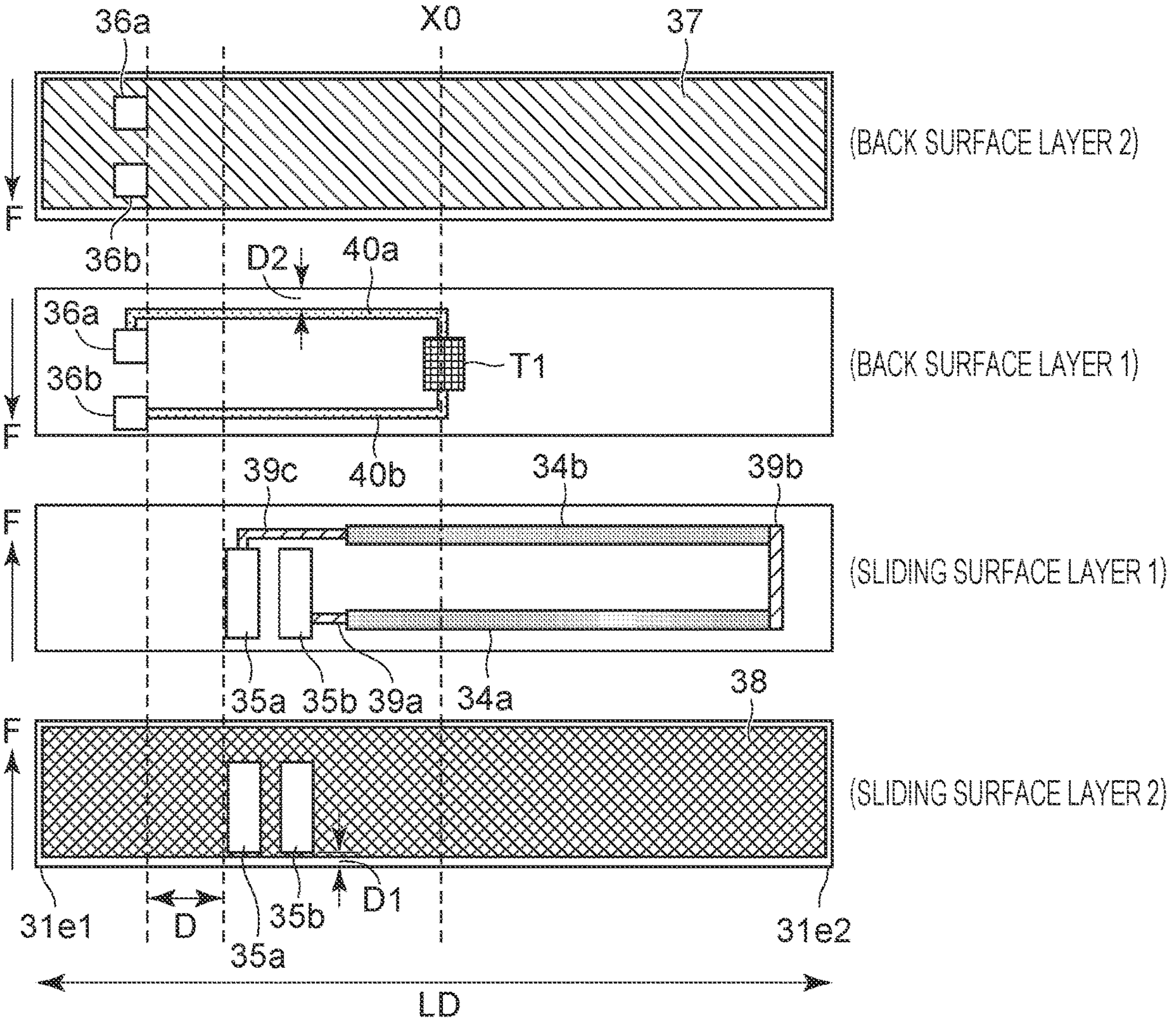
FIG. 4 is a cross-sectional view of a heater according to a comparative example.

FIG. 4 illustrates a comparative example of the present embodiment, in which the thermistor electrodes 36*a* and 36*b* are disposed at a position farther from the conveyance reference position X0 of the heater 30 than the heat generating element electrodes 35*a* and 35*b* (the positional relationship opposite to that according to the present embodiment). In this case, the heat generating element electrodes 35*a* and 35*b* need to have an insulation distance from the conductor 40*a* connected to the thermistor T1 in the back surface layer such that the insulation distance is the sum of a distance in the thickness direction of the heater 30 and creepage distances D1 and D2 in the transverse direction of a heater substrate. To ensure the above-described insulation distance via a distance in the thickness direction of the heater 30 and creepage distances D1 and D2 in the transverse direction of a heater substrate, the length of the substrate 31 in the transverse direction needs to be increased. In addition, the portion of the heater back surface layer 33 excluding the thermistor electrodes 36*a* and 36*b* is covered by the protective glass 37. At this time, since the protective glass 37 is used to protect the back surface, grass having low insulation performance is employed. In contrast, as the protective glass 38 for the sliding surface layer 32, glass having high insulating properties is employed to withstand external noise, such as lightning surge mixed into an AC line. To avoid the above-described increase in the length of the substrate 31 in the transverse direction, glass used as the protective glass 37 can be replaced with glass having high insulating properties used for the protective glass 38. However, the cost increases. By arranging the heat generating element electrodes 35*a* and 35*b* and the thermistor electrodes 36*a* and 36*b* in the manner described in the present embodiment, an increase in the length of the substrate 31 in the transverse direction can be prevented while ensuring the insulation distances among the heat generating element electrode, the thermistor electrode, and the conductor.

Second Embodiment

According to the first embodiment, the configuration has been described that includes the heater 30 having one thermistor T1 and that prevents an increase in the length in the transverse direction while ensuring an insulation distance. According to the present embodiment, a configuration is described that includes the heater 30 having one thermistor T1 and that prevents an increase in the size of the heater 30 not only in the transverse direction but also in the thickness direction while ensuring the insulation distance. Note that the same reference numerals are used in the second embodiment for parts having the same configurations and functions as those illustrated in the first embodiment, and description of the parts is not repeated. The configuration of the heater 30 according to the present embodiment is the same as that illustrated in FIGS. 3A and 3B according to the first embodiment. That is, the sliding surface layer 32 of the substrate 31 is provided with the heat generating elements 34*a* and 34*b* and the heat generating element electrodes 35*a* and 35*b*, and the back surface layer 33 of the substrate 31 is provided with the thermistor T1, the conductors 40*a* and 40*b*, and the thermistor electrodes 36*a* and 36*b*.

Configuration of Electrical Contact Member and Conductive Member

The configuration according to the first embodiment is described first in which the electrical contact member and the conductive member are connected to the heat generating element and the thermistor electrode to secure energization of the control circuit 14.

Figure 6:
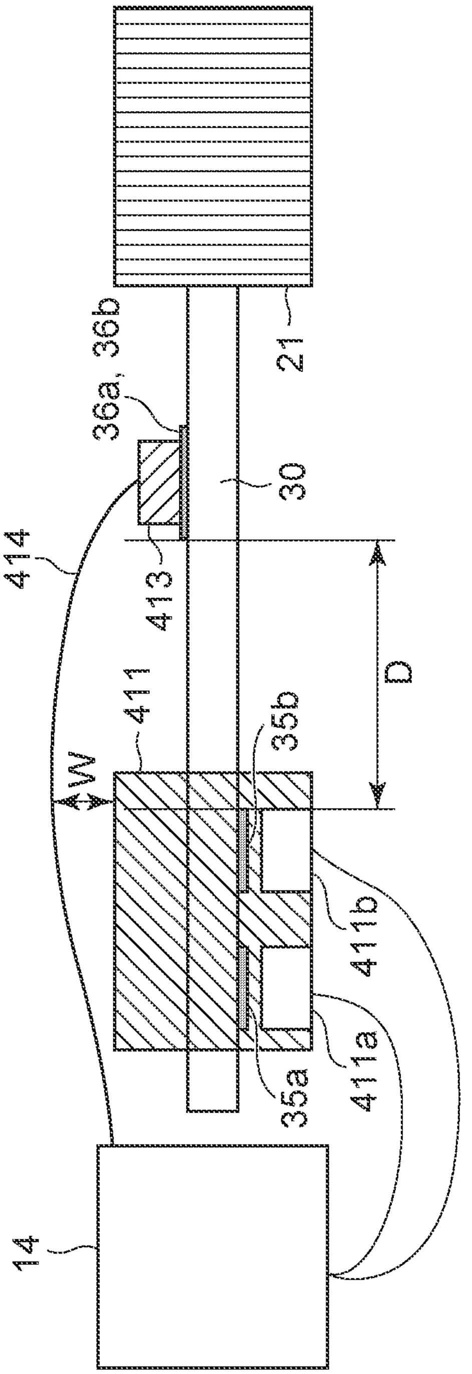
FIG. 6 is a top view of an end portion of the fixing unit according to the first embodiment.
Figure 11:
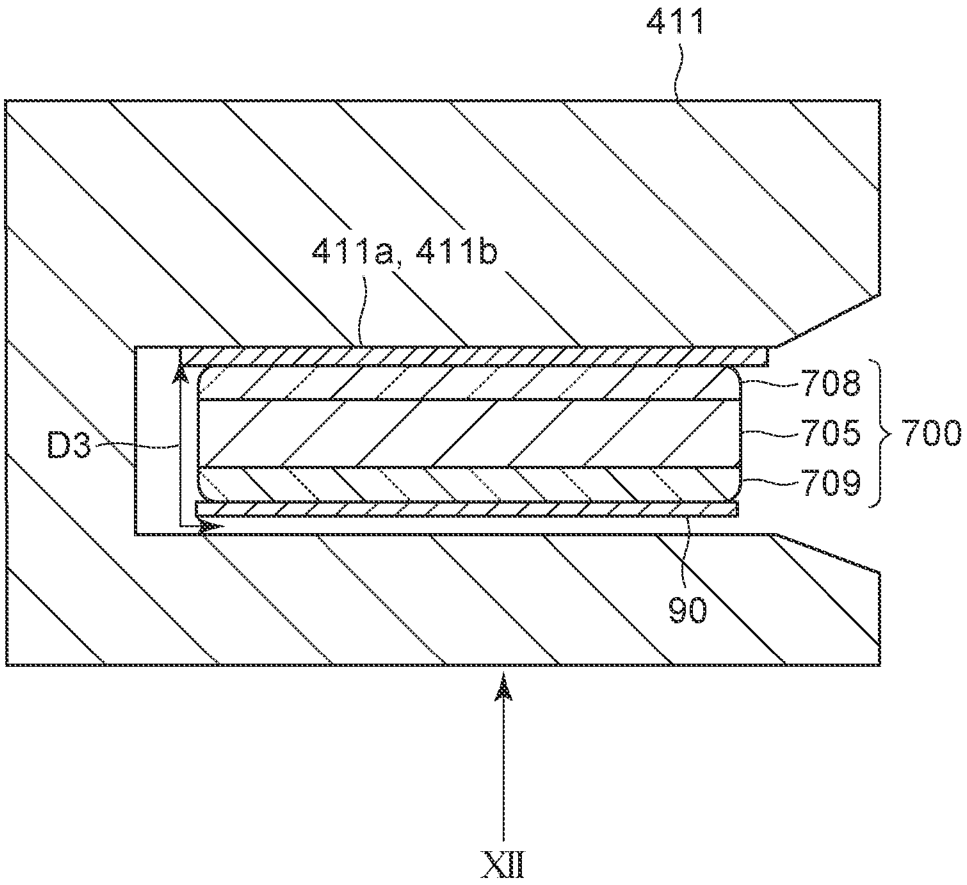
FIG. 11 is a side view of a fitting portion of an AC connector and the heater according to the third embodiment.

FIG. 6 illustrates the heater illustrated in FIGS. 3A and 3B and the control circuit 14 illustrated in FIG. 5 that are electrically connected to each other. As illustrated in FIG. 11 (described later), the AC connector 411 includes springy terminals 411*a* and 411*b* in U-shaped heat-resistant molds so as to pinch the heater 30 from above and below in a U-shaped opening. Thus, the AC connector 411 is assembled to the heater 30. With this configuration, the terminals 411*a* and 411*b* are fitted to the heat generating element electrodes 35*a* and 35*b* and are electrically connected.

Each of the terminals 411*a* and 411*b* is connected to the control circuit 14 by using an AC bundle wire. A current for driving the heat generating elements 34*a* and 34*b* is supplied from the control circuit 14 to the AC connector 411. The thermistor electrodes 36*a* and 36*b* are connected to the control circuit 14 by using the DC connector 413 and the DC bundle wire 414. The DC bundle wire 414 is held by a bundle wire guide or the like to ensure a necessary distance W so as not to come into contact with the AC connector 411. The DC connector 413 is installed at a heat resistant distance from the end of the film 21.

Figure 7:
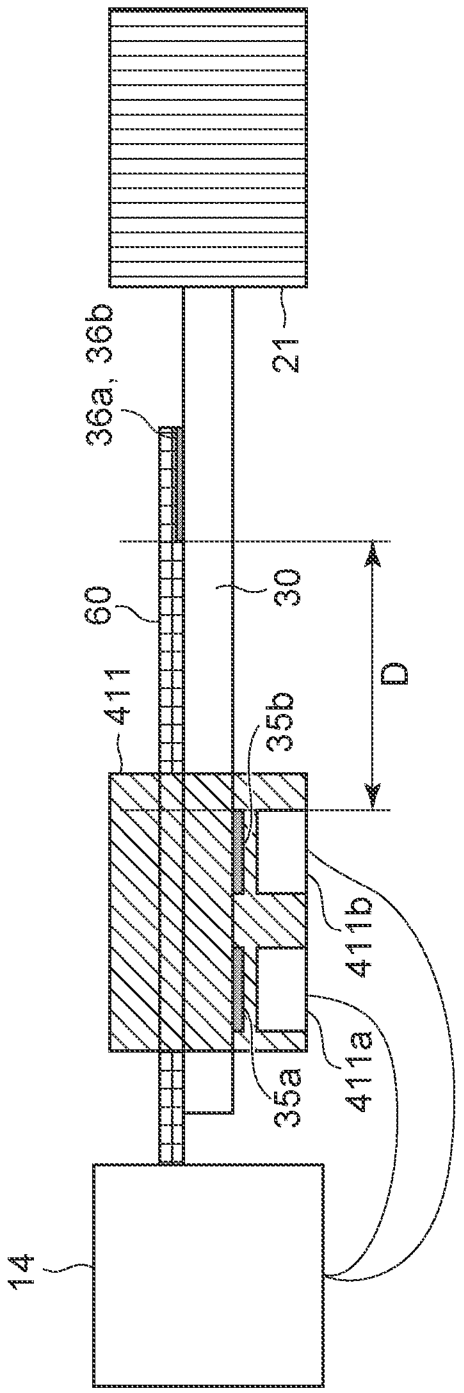
FIG. 7 is a top view of an end portion of a fixing unit according to a second embodiment.

The configuration is described below with reference to FIG. 7 in which the electrical contact member and the conductive member according to the second embodiment are connected to the heat generating element electrodes 35*a* and 35*b* and the thermistor electrodes 36*a* and 36*b* to ensure energization of the control circuit 14.

According to the present embodiment, a flexible flat cable (FFC) 60 is used to connect the control circuit 14 to the thermistor electrodes 36*a* and 36*b*. The FFC 60 is a film-like flat cable having a thickness of about 0.3 mm in which a plurality of conductive patterns are formed in parallel at equal intervals (for example, 1-mm intervals) in a film-like inner layer of an insulating body.

As described above, the AC connector 411 has a configuration in which the springy terminals 411*a* and 411*b* are provided in the U-shaped heat-resistant molds. The FFC 60 connected to the thermistor electrodes 36*a* and 36*b* is disposed so as to extend in the longitudinal direction of the heater 30. The FFC 60 is electrically connected to the thermistor electrodes 36*a* and 36*b* by using high melting point solder, welding, or the like. In addition, the heater 30 and FFC 60 are pinched by the U-shaped opening of the AC connector 411 to assemble the heater 30 and FFC 60 and, thus, the terminals 411*a* and 411*b* are connected to the heat generating element electrodes 35*a* and 35*b*, respectively, and the FFC 60 is fixed by the AC connector 411. In this way, at least part of the FFC 60 is held by the substrate 31. Note that it is assumed that an insulation distance is ensured between the FFC 60 and the heat generating element electrodes 35*a* and 35*b* in the AC connector 411. The configurations of the other members are the same as those of the first embodiment.

As described above, according to the first embodiment, the DC bundle wire 414 is used as a bundle wire connecting the thermistor electrodes 36*a* and 36*b* to the control circuit 14. When the DC bundle wire 414 is used, the DC bundle wire 414 passes through the outside of the AC connector 411 so as not to come into contact with the AC connector 411, as illustrated in FIG. 6. For this reason, the heater 30 and the heater of the fixing unit 20 in the thickness direction has a size as large as the size indicated by the distance W. Therefore, according to the second embodiment, as illustrated in FIG. 7, the FFC 60 is used as the bundle wire connecting the thermistor electrodes 36*a* and 36*b* to the control circuit 14. According to the second embodiment, by assembling the heater 30 and the FFC 60 so as to be pinched by the U-shaped opening of the AC connector 411, an increase in the size of the heater of the fixing unit 20 in the thickness direction need not be taken into account. As described above, according to the configuration of the present embodiment, an increase in the size of the heater 30 not only in the transverse direction but also in the thickness direction can be prevented while ensuring an insulation distance.

Third Embodiment

According to the first and second embodiments, the configuration in which the heater 30 includes one thermistor T1 has been described. According to the present embodiment, a configuration is described that has the heater 30 including a plurality of thermistors and that prevents an increase in the width of the heater in the transverse direction while ensuring the insulation distance between the heat generating element electrode and the thermistor electrode. Note that the same reference numerals are used in the third embodiment for parts having the same configurations and functions as those illustrated in the first and second embodiments, and description of the parts is not repeated.

Configuration of Heater

Figure 8A:
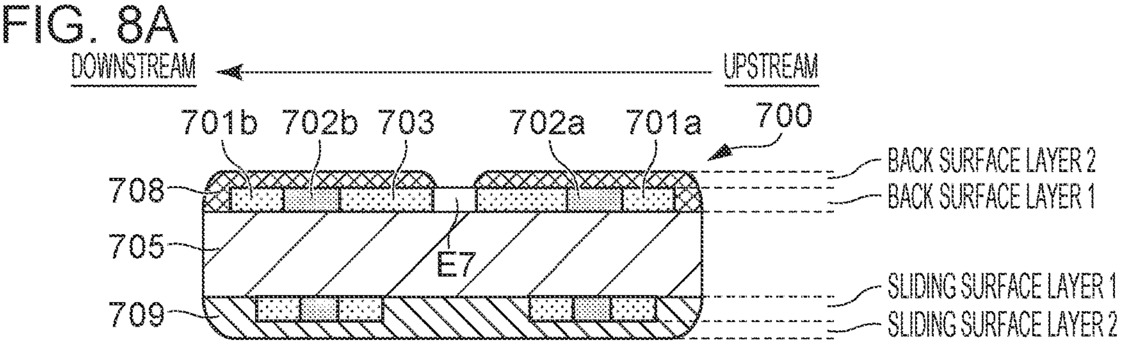
FIGS. 8A and 8B are cross-sectional views of a heater according to a third embodiment.
Figure 8B:
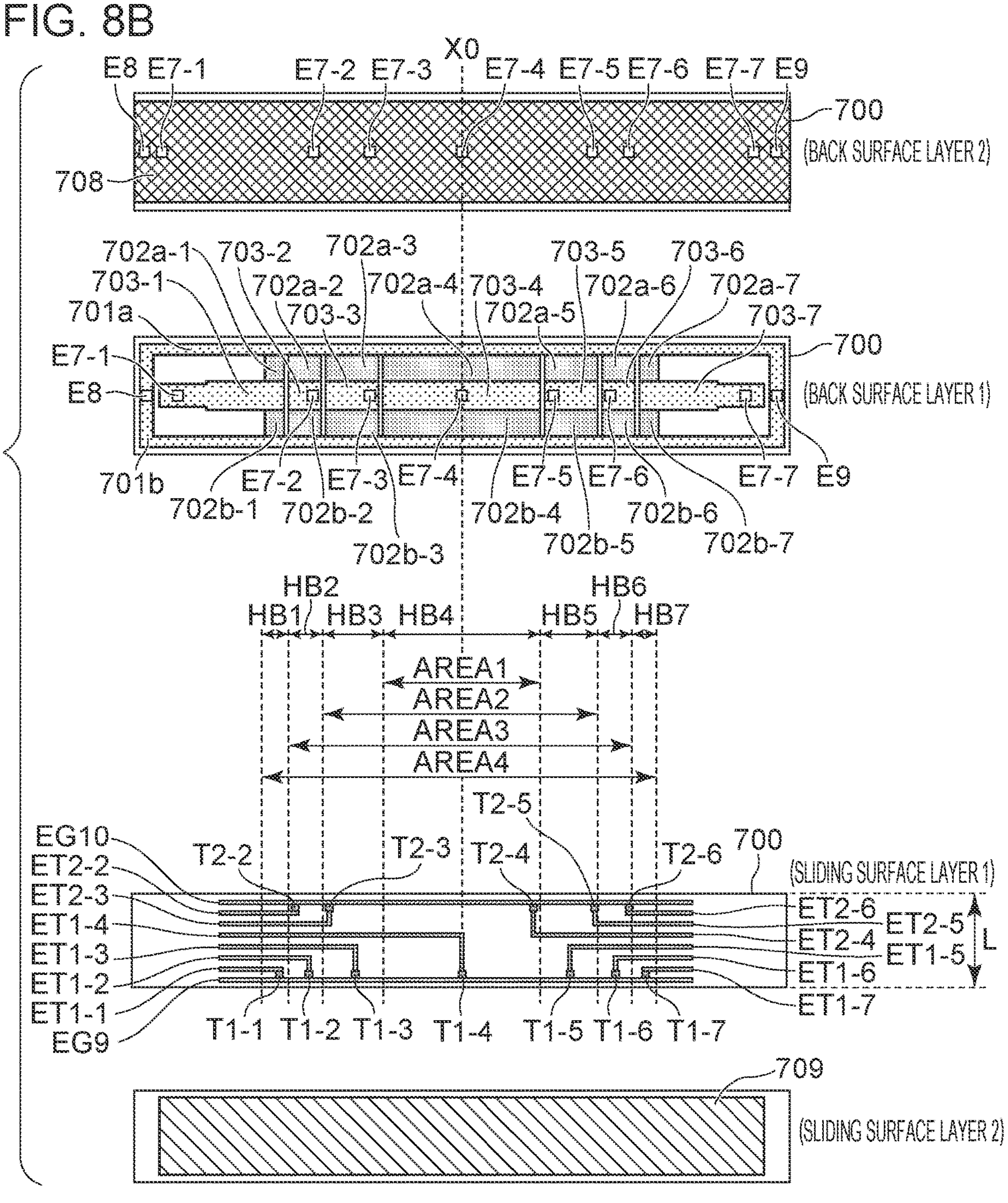

The configuration of a heater 700 according to the present embodiment is described first with reference to FIGS. 8A and 8B. FIG. 8A is a transverse cross-sectional view of the heater 700 taken substantially at the conveyance reference position X0 illustrated in FIG. 8B.

The back surface layer 1 of the heater 700 includes a conductor 701 and a conductor 703 on a substrate 705.

The conductor 701 separates into a conductor 701*a* disposed on the upstream side in the conveyance direction of the recording medium P and a conductor 701*b* disposed on the downstream side. The heater 700 is provided between the conductor 701 and the conductor 703. The heater 700 includes a heat generating element 702 that generates heat by electric power supplied via the conductor 701 and the conductor 703. The heat generating element 702 separates into a heat generating element 702*a* disposed on the upstream side in the conveyance direction of the recording medium P and a heat generating element 702*b* disposed on the downstream side.

In addition, electrodes E7-1 to E7-7 are provided to supply electric power to the heat generating element 702*a* and the heat generating element 702*b*. Furthermore, in the back surface layer 2, insulating protective glass 708 covers a portion excluding the electrodes E7-1 to E7-7.

FIG. 8B is a plan view of the heater 700. The layers are described below. In the back surface layer 1, seven heating blocks HB1 to HB7 each composed of a set of a conductor 701, a conductor 703, a heat generating element 702, and one of electrodes E7-1 to E7-7 are arranged in the longitudinal direction of the heater 700.

The insulating protective glass 708 in the back surface layer 2 is formed in a portion excluding the electrodes E7-1 to E7-7 and the electrodes E8 and E9, and electrical contacts (not illustrated) are connected to the electrodes E7-1 to E7-7 and the electrodes E8 and E9 from the back surface side of the heater 700. This configuration enables the heating blocks HB1 to HB7 to be fed with power independently and be power controlled independently. By dividing the heating block HB into seven heating blocks HB1 to HB7 in this way, a heat generation distribution corresponding to at least four sheet feeding regions (refer to AREAs 1 to 4 illustrated in FIG. 8B) can be formed. According to the present embodiment, AREA1 is classified for an A5 sheet, AREA2 is classified for a B5 sheet, AREA3 is classified for an A4 sheet, and AREA4 is classified for a letter sheet. Then, a heating block HB for feeding power is selected in accordance with the size of the recording medium P. Note that the number of AREAs and the number of heating blocks HB are not limited to those of the present embodiment. In addition, heat generating elements 702*a*-1 to 702*a*-7 and 702*b*-1 to 702*b*-7 in the heating blocks are not limited to the configuration according to the present embodiment in which the entire pattern functions as a heat generating element. For example, a strip-shaped pattern having a gap portion can be used. Note that by changing the percentage of the electric power supplied to each of the heating blocks, five or more heat generation distributions can be formed.

Thermistors T1-1 to T1-7 and thermistors T2-2 to T2-6 are provided on the sliding surface layer 1 to detect the temperatures of the heating blocks HB of the heater 700. Since the thermistors T1-1 to T1-7 are mainly used for temperature control of the heating blocks, the thermistors T1-1 to T1-7 are disposed at the centers of the corresponding heating blocks. Thermistors T2-2 to T2-6 are edge thermistors for detecting the temperatures of a non-sheet feeding region (an edge portion) when the recording medium P having a width that does not match the width of AREA1 to 4 is fed. For this reason, the edge thermistor is disposed in each of the heating blocks HB2 to HB6 at a position away from the conveyance reference position X0, except for the heating blocks HB1 and HB7 that are located at both ends and that have a small width. The thermistors T1-1 to T1-7 are connected to conductors ET1-1 to ET1-7 for detecting the resistance values of the thermistors, respectively, and all of the thermistors T1-1 to T1-7 are connected to a common conductor EG9. The thermistors T2-2 to T2-6 are connected to conductors ET2-2 to ET2-6, respectively, and all the thermistors T2-2 to T2-6 are connected to a common conductor EG10. As described above, a width L of the heater 700 tends to increase with increasing number of thermistors and increasing number of conductors.

The sliding surface layer 2 is provided with a surface protective layer 709 made of slidable glass. The surface protective layer 709 is provided on a portion except for both end portions of the heater 700 because the end portions of each of the conductors in the sliding surface layer 1 are to function as electrodes.

Control Circuit of Fixing Unit

Figure 9:
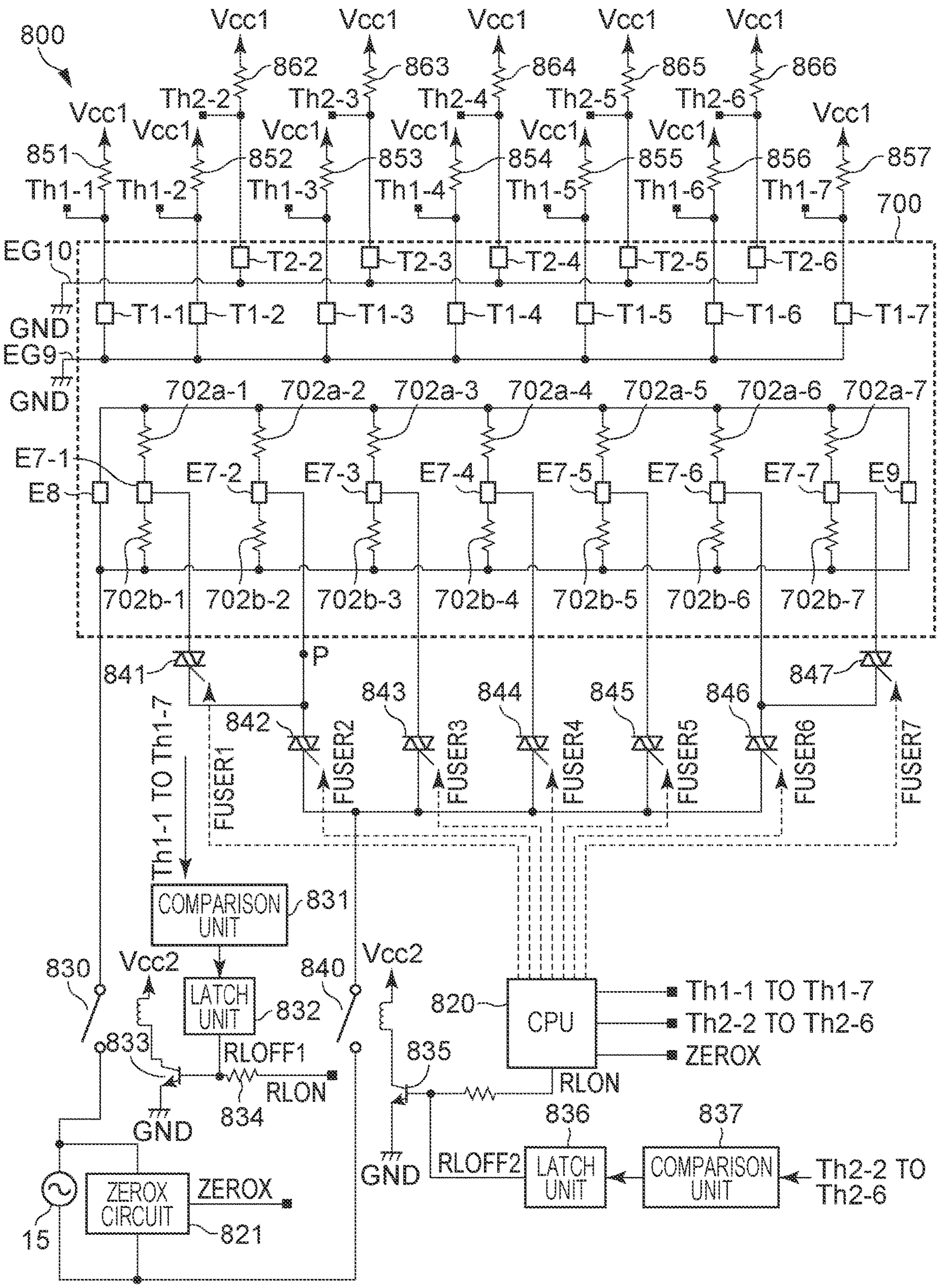
FIG. 9 is a drive circuit diagram including a fixing unit according to the third embodiment.

FIG. 9 is a control circuit 800 of the heater 700 according to the present embodiment. The AC power supply 15 is a commercial AC power supply connected to the image forming apparatus 1. Power supply voltages Vcc1 and Vcc2 are DC voltages generated by an AC/DC converter (not illustrated) connected to the AC power supply 15.

The AC power supply 15 is connected to the heater 700 via relays 830 and 840 and triacs 841 to 847. The triacs 841 to 847 are switched on and off by the control signals FUSER1 to FUSER7 from a CPU 820, respectively. One or more driving circuits of the triacs 841 to 847 are not illustrated.

A temperature detection circuit of the thermistor is described below. The conductors EG9 and EG10 are connected to the ground potential. The voltage Vcc1 is divided by the thermistors T1-1 to T1-7, the thermistors T2-2 to T2-6, resistors 851 to 857, and resistors 862 to 866 described with reference to FIGS. 8A and 8B. The divided voltages are detected by the CPU 820 as a Th1-1 signal to a Th1-7 signal and a Th2-2 signal to a Th2-6 signal. Then, the voltages are converted into temperatures by using information preset in an internal memory of the CPU 820 and, thus, the temperature of the heat generating element 702 is detected.

In the internal processing performed by the CPU 820, the electric power to be supplied is calculated on the basis of the set temperatures and the detected temperatures of the thermistors T1-1 to T1-7 through, for example, PI control. The CPU 80 converts the calculated electric power into the phase angle (phase control) and the wave number (wave number control) which are control levels corresponding thereto. Thus, the CPU 820 controls the triacs 841 to 847 in accordance with the zero crossing timing of the AC power supply 15 detected by the zero crossing circuit 821.

The relays 830 and 840 and a protection circuit are described below. The relays 830 and 840 are used as power shutdown units for shutting down power to the heater 700 when the temperature of the heater 700 excessively rises due to a malfunction or the like.

The operation performed by the relay 830 is described below. When the CPU 820 toggles an RLON signal to "High" state, the transistor 833 is turned on. Thus, the power supply voltage Vcc2 energizes a secondary coil of the relay 830, and a primary contact of the relay 830 enters ON state. When the CPU 820 toggles the RLON signal to "Low" state, the transistor 833 enters OFF state. Thus, a current flowing from the power supply voltage Vcc2 to the secondary coil of the relay 830 is cut off, and the primary contact of the relay 830 enters OFF state. The same applies to the operation performed by the relay 840.

The operation performed by a safety circuit using the relay 830 and the relay 840 is described below. When the detected temperature of any one of the thermistors T1-1 to T1-7 exceeds a predetermined set value, a comparison unit 831 causes a latch unit 832 to operate, and the latch unit 832 sets an RLOFF1 signal in Low state for latching. When the RLOFF1 signal enters Low state, the transistor 833 is kept in OFF state even if the CPU 820 toggles the RLON signal to High state, so that the relay 830 can be kept in OFF state (a safe state). Similarly, for the thermistors T2-2 to T2-6, if the detected temperature exceeds a predetermined set value, a comparison unit 837 causes a latch unit 836 to operate, and the latch unit 836 sets an RLOFF2 signal in Low state for latching. As described above, the relays 830 and 840 are also used as power cutoff units for the heater 700 when the temperature of the heater 700 excessively rises due to a malfunction or the like.

The relationship between the drive configuration using the triacs 841 to 847 and the number of thermistors is described below. The triac 841 that drives the heating block HB1 is connected in series with the triac 842 that drives the adjacent heating block HB2. When only the triac 842 is driven, only the heating block HB2 generates heat. When both the triacs 841 and 842 are driven, the heating blocks HB1 and HB2 generate heat. In this configuration, control is performed such that only the heating block HB1 does not generate heat. Furthermore, in this configuration, since the control in which the heating block HB2 generates heat and the control in which the heating blocks HB1 and HB2 generate heat can be selected, control can be performed to select the heat generation region for each sheet size.

According to the present embodiment, the safety circuit is provided to prevent the heater 700 from generating heat up to an abnormal temperature when abnormality occurs in the control of the heater 700 due to a malfunction of the CPU 820 or the like. In addition, the safety circuit according to the present embodiment is configured so that even if one constituent element malfunctions and the heater 700 does not function, the heater 700 can be protected by detecting the abnormality in the heater 700 and turning off the relays 830 and 840. To this end, for example, the two thermistors T1-3 and T2-3 and the comparison unit and the latch unit corresponding to each of the thermistors T1-3 and T2-3 are provided in the heating block HB3. In this way, even if one of the thermistors T1-3 and T2-3 malfunctions, the safety can be assured. Since each of the heating blocks HB2, HB4, HB5, and HB6 is also controlled by an independent drive configuration, two thermistors are similarly configured. Note that the heating block HB1 can be protected by a single thermistor T1-1 because only the heating block HB1 does not generate abnormal heat unless a malfunction occurs such that breaking of wire occurs at a point P in FIG. 9.

Since the same applies to the heating block HB7, description of the heating block HB7 is not given. Note that since the heating blocks HB1 and HB7 have a narrow heat generation region, a single thermistor is used as both the edge thermistor for detecting the temperature in the non-sheet feeding region (the edge portion) and the thermistor for controlling the temperature.

In this way, for the heating block HB1 driven by a semiconductor device located downstream of a semiconductor device for driving the heating block HB2, even a configuration having thermistors less in number than those of the heating block HB2 can protect the heater 700 at the time of one malfunction.

Configurations of Electrical Contact Member and Conductive Member

A configuration is described with reference to FIG. 10 in which the electrical contact member and the conductive member according to the present embodiment are connected to the heat generating element electrode and the thermistor electrode and, thus, the control circuit 800 is energized.

According to the present embodiment, like the first embodiment, the thermistor electrodes EG10 to EG9, that are the end portions of the conductors EG10 to EG9, are disposed closer to the center of the heater 700 than the heat generating element electrodes E7-1 and E8 to prevent an increase in size of the heater in the transverse direction. In addition, like the second embodiment, the flexible flat printed circuit (FPC) 90 is used to connect the control circuit 800 to the thermistor electrodes EG9, ET1-1 to ET1-4, ET2-3, ET2-2, and EG10.

An FPC is a film-like flat cable having a thickness of about 0.3 mm in which a plurality of conductive patterns are wired in a film-like insulating inner layer. In the FFC 60 described in the second embodiment, the conductive patterns are formed in parallel at equal intervals (0.5-mm or 1-mm intervals). In contrast, in the FPC 90, the conductive patterns can be formed at any intervals and shapes. For this reason, the interval between the conductive patterns is decreased to 0.3 mm. By using the FPC 90, the interval between adjacent patterns can be decreased as compared with the case of forming a pattern on the heater substrate or the FFC 60.

Furthermore, the control circuit 800 is connected to the AC connector 411 to drive the heat generating elements 702*a*-1 and 702*b*-1. The terminal 411*a* in the AC connector 411 is connected to the heat generating element electrode E8, and the terminal 411*b* in the AC connector 411 is connected to the heat generating element electrode E7-1.

Figure 10:
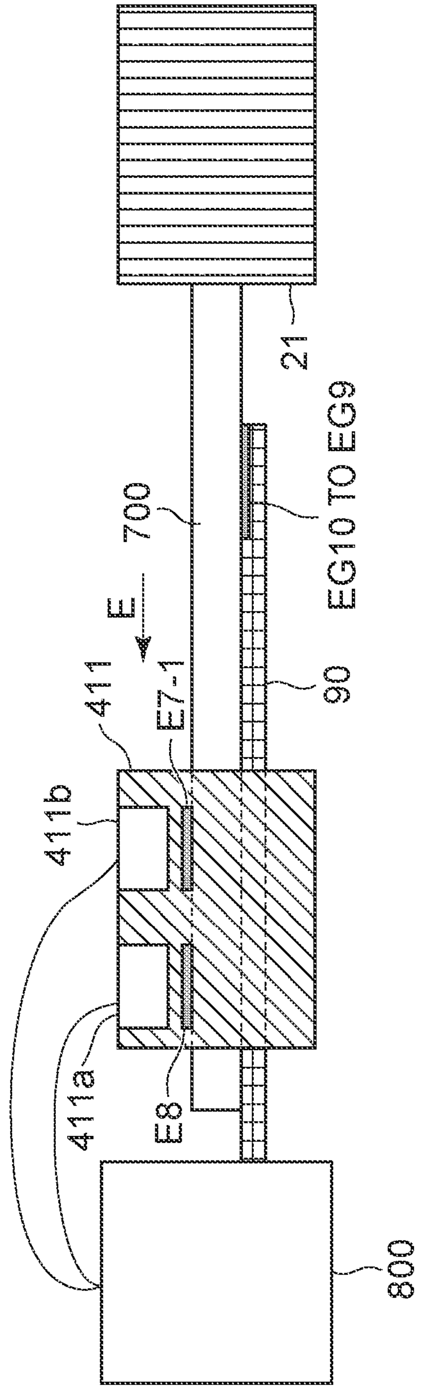
FIG. 10 is a top view of an end portion of the fixing unit according to the third embodiment.

FIG. 11 is a view of the heater 700 and the FPC 90 in the AC connector 411 illustrated in FIG. 10 as viewed in the direction of an arrow E. According to the present embodiment, like the second embodiment, the AC connector 411 is assembled so as to pinch the heater 700 and the FPC 90 by using the U-shaped opening thereof. With this configuration, the terminals 411*a* and 411*b* are electrically connected to the heat generating element electrodes 35*a* and 35*b*, respectively, and the FPC 90 is fixed by the AC connector 411. Note that as illustrated in FIGS. 11 and 12, between the conductive pattern in the FPC 90 and each of the terminals 411*a* and 411*b*, a creepage distance D3, which is the sum of a distance of the heater 700 in the thickness direction and creepage distances D4 and D5 in the transverse direction of the heater 700, is required as the insulation distance.

Figure 12:
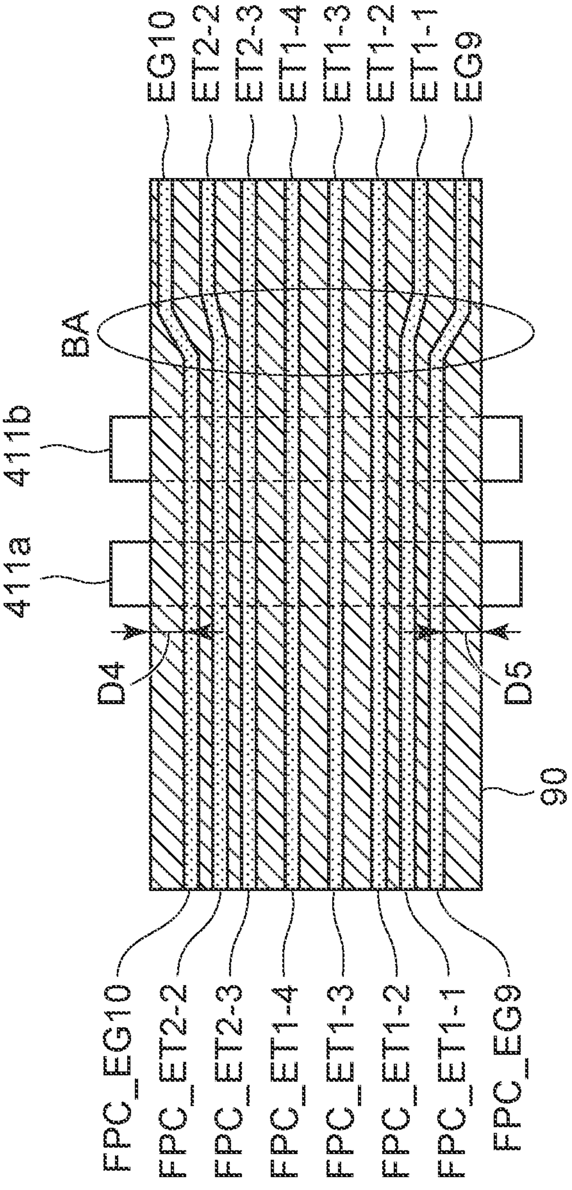
FIG. 12 illustrates an FPC pattern spaced apart from an AC electrode according to the third embodiment.

FIG. 12 is a view of the FPC 90 and the terminals 411*a* and 411*b* illustrated in FIG. 11 as viewed in the direction of an arrow XII, according to the present embodiment. For simplicity, in FIG. 12, the mold of the AC connector 411 is not illustrated, and only the terminals 411*a* and 411*b* are illustrated. The thermistor electrodes EG9, ET1-1 to ET1-4, ET2-3, ET2-2, and EG10, the control circuit 800, and the conductive pattern in the FPC 90 are connected by using high melting point solder, welding, or the like. Although as described above, conductive patterns in the FPC 90 can be formed at any intervals and shapes, an appropriate copper foil spacing and an appropriate shape are required in the connection portion of the FPC (one end of the FPC) with the thermistor electrode due to restrictions on the connection technique. In addition, since the other end of the FPC is connected to the control circuit 800, it is desirable to use conductive patterns at equal intervals of, for example, 0.5 mm so that the end can be connected to a general-purpose FFC connector.

A portion where the terminals 411*a* and 411*b* in the AC connector intersect with the FPC 90 is described below. As illustrated in FIG. 11, the sum of the distance D3 and the distance D4 (D5) needs to be maintained between each of the terminals 411*a* and 411*b* in the AC connector 411 and each of the patterns in the FPC 90.

A sufficient creepage distance is easily ensured between each of the four patterns (FPC_ET1-2 to FPC_ET1-4, FPC_ET2-3) wired near the center in the transverse direction of the FPC 90 and each of the terminals 411*a* and 411*b*. In contrast, it is difficult to ensure a sufficient distance for maintaining the insulation distance between each of the patterns (FPC_EG10, FPC_ET2-2, FPC_ET1-1, FPC_EG9) disposed in the end portion of the FPC 90 in the transverse direction and each of the terminals 411*a* and 411*b*. For this reason, the conductive patterns FPC_EG10, FPC_ET2-2, FPC_ET1-1, and FPC_EG9 disposed in the end portion of the FPC 90 in the transverse direction are shifted toward the center of the FPC 90 in the transverse direction (are bent in a region BA as illustrated in FIG. 12).

In this way, the conductive patterns FPC_EG10, FPC_ET2-2, FPC_ET1-1, and FPC_EG9 can provide the insulation distance (creepage distance) D4 or D5 from the terminal 411*a* or 411*b*. If the insulation distance D4 or D5 can be provided, a configuration can be employed in which the two conductive patterns at both the ends (the conductive patterns FPC_EG10 and FPC_EG9) or the conductive pattern at one of the two ends (the conductive patterns FPC_EG10 or FPC_EG9) bend toward the center of the FPC 90 in the transverse direction. Alternatively, all the conductive patterns in the FPC 90 may be disposed at equal intervals in the transverse direction.

In the FFC 60 described in the second embodiment, the conductive patterns are disposed at equal intervals in the transverse direction. For this reason, to ensure the insulation distances D4 and D5 from the heat generating element electrodes 35*a* and 35*b*, the widths of the FFC 60 and the heater substrate in the transverse direction need to be increased. In addition, in the case where the conductive patterns are directly formed on the substrate 705, it is difficult to decrease the distance between the adjacent patterns in the transverse direction as compared with the case where the pattern is formed on the FPC 90. Therefore, according to the present embodiment, by using the FPC 90 as described above, the distance between the conductive patterns can be decreased so as to ensure the insulation distances D4 and D5 from the terminals 411*a* and 411*b*. As a result, the width of the heater in the transverse direction can be decreased as compared with the case of using the FFC 60.

As described above, according to the present embodiment, even when the heater 30 includes a plurality of thermistors, an increase in the size of the heater 700 in the transverse direction can be prevented while ensuring the insulation distances D4 and D5 from the terminals 411*a* and 411*b* by using the FPC 90.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-040612 filed Mar. 12, 2021, which is hereby incorporated by reference herein in its entirety.

What is claimed is:

1. A heater for use in an image heating device, the heater comprising:

a substrate;

a plurality of heat generating elements formed on a first surface of the substrate, wherein the plurality of heat generating elements is arranged in a longitudinal direction of the substrate and is independently controllable;

a first electrode group formed on the first surface and electrically connected to the plurality of heat generating elements, wherein a plurality of first feed terminals provided in the image heating device is in contact with a contact region of each of first electrodes belonging to the first electrode group;

a plurality of temperature detection elements formed on a second surface opposite to the first surface of the substrate, wherein the plurality of temperature detection elements is arranged in the longitudinal direction of the substrate and is arranged to correspond to the plurality of heat generating elements; and a second electrode group formed on the second surface and electrically connected to the plurality of temperature detection elements, wherein a plurality of second feed terminals provided in the image heating device is in contact with a contact region of each of second electrodes belonging to the second electrode group, wherein the contact region of at least a part of the first electrode group and the contact region of at least a part of the second electrode group are disposed on the same side of a midpoint of the substrate in the longitudinal direction, wherein the contact region of the at least a part of the first electrode group disposed on the same side of the midpoint of the substrate include a first contact region and a second contact region disposed closer to the substrate midpoint than the first contact region, the contact region of the at least a part of the second electrode group is disposed closer to the substrate midpoint than the first contact region in the longitudinal direction, wherein the second contact region is disposed closer to the substrate midpoint than the contact region of the at least a part of the second electrode group in the longitudinal direction, and wherein the first contact region and the contact region of the at least a part of the second electrode group are disposed with a gap between the first contact region and the contact region of the at least a part of the second electrode group in the longitudinal direction.

2. An image heating device for heating an image formed on a recording medium, the image heating device comprising:

a film having a cylindrical shape;

a heater disposed in interior space of the film, wherein the heater includes:

a substrate, a plurality of heat generating elements formed on a first surface of the substrate, wherein the plurality of heat generating elements is arranged in a longitudinal direction of the substrate and is independently controllable, a first electrode group formed on the first surface and electrically connected to the plurality of heat generating elements, a plurality of temperature detection elements formed on a second surface opposite to the first surface of the substrate, wherein the plurality of temperature detection elements is arranged in the longitudinal direction of the substrate and is arranged to correspond to the plurality of heat generating elements, and a second electrode group formed on the second surface and electrically connected to the plurality of temperature detection elements;

a nip portion forming member configured to form a nip portion via the film together with the heater;

a plurality of first feed terminals in contact with a contact region of each of first electrodes belonging to the first electrode group; and a plurality of second feed terminals in contact with a contact region of each of second electrodes belonging to the second electrode group, wherein the image formed on the recording medium is heated in the nip portion while the recording medium is being nipped and conveyed in the nip portion, wherein the contact region of at least a part of the first electrode group and the contact region of at least a part of the second electrode group are disposed on the same side of a midpoint of the substrate in the longitudinal direction, wherein the contact region of the at least a part of the first electrode group disposed on the same side of the midpoint of the substrate include a first contract region and a second contact region disposed closer to the substrate midpoint than the first contact region, the contact region of the at least a part of the second electrode group is disposed closer to the substrate midpoint than the first contact region in the longitudinal direction, wherein the second contact region is disposed closer to the substrate midpoint than the contact region of the at least a part of the second electrode group in the longitudinal direction, and wherein the first contact region and the contact region of the at least a part of the second electrode group are disposed with a gap between the first contact region and the contact region of the at least a part of the second electrode group in the longitudinal direction.

3. The image heating device according to claim 2, wherein the plurality of first feed terminals is disposed in a first connector configured to pinch the substrate.

4. The image heating device according to claim 2, wherein the plurality of second feed terminals is disposed in a second connector.

5. The image heating device according to claim 2, wherein the plurality of second feed terminals is a plurality of conductive patterns disposed inside of an insulating layer of a film-like flat cable.

6. The image heating device according to claim 5, wherein the plurality of first feed terminals is disposed in a first connector configured to pinch the substrate and the film-like flat cable.

7. The image heating device according to claim 6, wherein, among the plurality of conductive patterns, a conductive pattern closest to an end of the substrate in a transverse direction is bent toward a midpoint of the substrate in the transverse direction.

8. The image heating device according to claim 6, wherein the film-like flat cable is located between the substrate and the first connector in a thickness direction of the substrate.

* * * * *